United States Patent Office 3,251,862
Patented May 17, 1966

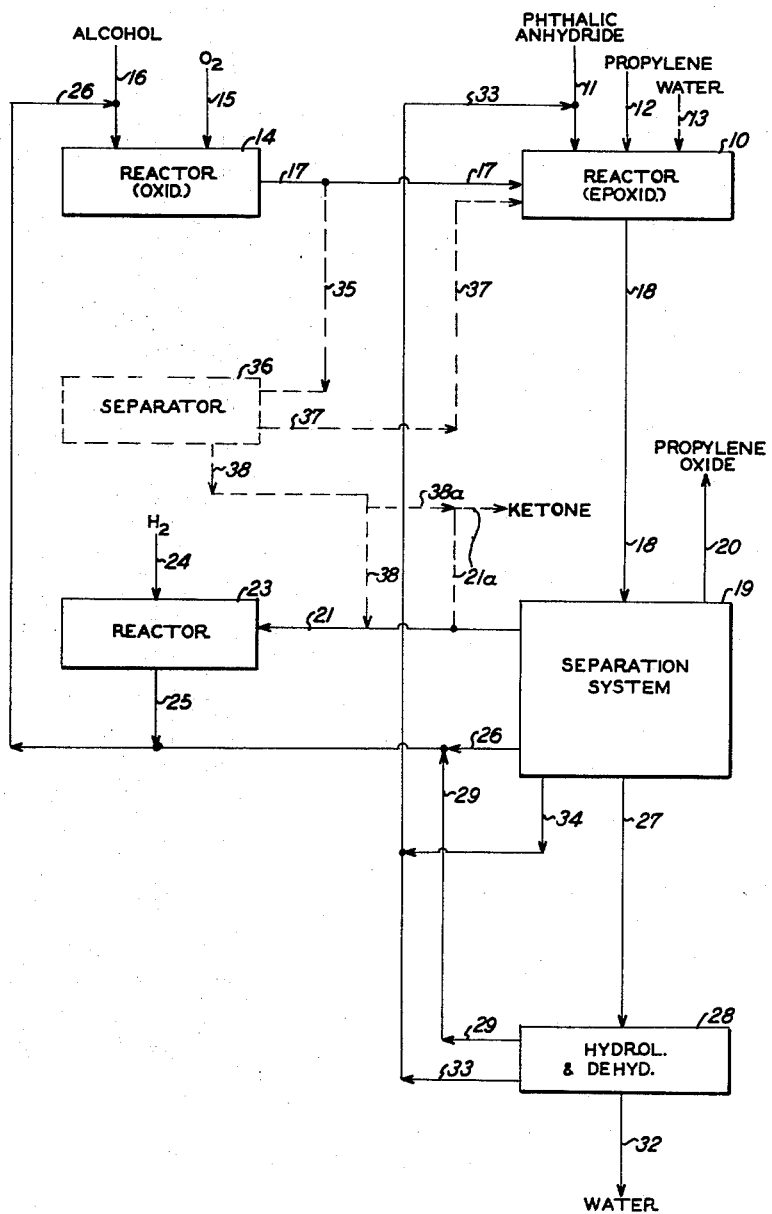

3,251,862
PROCESS FOR PREPARING PROPYLENE OXIDE
Rex E. Lidov, Great Neck, N.Y., assignor to Scientific Design Company, Inc., a corporation of Delaware
Filed Oct. 15, 1962, Ser. No. 230,480
1 Claim. (Cl. 260—348.5)

This invention relates to a process for the manufacture of propylene oxide. More particularly, it relates to such a process in which propylene, oxygen and hydrogen can be the only necessary raw materials. Even more specifically, this invention relates to a process for the manufacture of propylene oxide via the epoxidation of propylene with perphthalic acid in which propylene and oxygen are the only necessary raw materials or alternatively in which a ketonic co-product can also be obtained; in some cases, hydrogen is used also.

Propylene oxide is an increasingly important intermediate for chemical manufacture. Particularly as the use of plastic foams which use intermediates derived from propylene oxide increase, there is ever expanding need for more, and less expensive, propylene oxide. Most propylene oxide today is made from propylene by means of the well-known chlorohydrin process. This manufacture requires that chlorine be used as an essential raw material; after use, the chlorine appears as hydrochloric acid and it is not readily or economically recyclable to the manufacturing process. Consequently, the manufacture of propylene oxide is on a less favorable basis than the corresponding manufacture of ethylene oxide since the latter can be produced using only ethylene and oxygen as essential raw materials. The art has long sought processes for manufacturing propylene oxide which would consume only propylene and oxygen, but even today there is no generally satisfactory solution to the problem thus posed. This invention does provide an answer to the problem of producing propylene oxide in an economical fashion while conserving essential raw materials.

The discoveries associated with the invention and relating to the solution of the above problems, and the objects achieved in accordance with the invention as set forth herein include the provision of:

a process for preparing propylene oxide which comprises reacting a mixture containing peroxidic oxygen with phthalic anhydride and with propylene whereby propylene oxide is formed, and recovering this propylene oxide;

such a process wherein the mixture containing peroxidic oxygen is prepared by reacting gaseous oxygen with a secondary alcohol in the presence of an oxidation initiator;

such a process wherein the unreacted secondary alcohol is recycled to the peroxidic reaction step;

such a process wherein unreacted phthalic anhydride is recycled to the propylene oxide formation step;

such a process wherein the by-product ketone is separated from the propylene oxide reaction mixture, hydrogenated to form the corresponding secondary alcohol which alcohol is passed to the peroxidic mixture formation step;

such a process wherein by-product cyclohexanone is separated from the propylene reaction mixture, hydrogenated to form cyclohexanol and this is passed to the peroxidic oxidation reaction step;

such a process wherein by-product phthalic acid is separated from the propylene reaction mixture, and dehydrated to reform the anhydride and this is passed to the propylene oxide formation step;

such a process wherein 4 to 25% of the secondary alcohol is converted to form a mixture containing 0.04 to 0.18 mol of peroxidic oxygen per 100 grams;

such a process wherein the secondary alcohol is cyclohexanol;

in a process wherein the by-product cyclohexanone is separated from the propylene oxide reaction mixture and hydrogenated to cyclohexanol and then passed to the oxidation reaction step along with any unreacted cyclohexanol;

such a process wherein the secondary alcohol is isopropanol;

such a process wherein by-product acetone is separated from the propylene oxide reaction mixture and hydrogenated to isopropanol and then passed to the peroxidic mixture formation step;

such a process wherein the propylene oxide formation step is carried out at a temperature in the range of 35° to 60° C.;

such a process wherein the propylene is added after the phthalic anhydride is mixed with the mixture containing peroxidic oxygen;

such a process wherein the propylene is mixed with phthalic anhydride and the resulting mixture is mixed with the mixture containing peroxidic oxygen;

such a process wherein propylene is added to the mixture containing peroxidic oxygen and then phthalic anhydride is added thereto;

and other objects which will be apparent as details or embodiments of the invention are set forth hereinafter.

In essence, we have found that the ketone hydroperoxides which are readily formed by the oxidation of secondary alcohols will react with phthalic anhydride to form perphthalic acid, and that the perphthalic acid thus formed can be used to bring about the epoxidation of propylene. Fortunately, it is not necessary to separate any of the reaction intermediates so that the series of reactions thus outlined can be carried out in particularly expeditious fashion.

The oxidation of secondary alcohols is most feasibly and economically carried only to that point at which a relatively small amount of the alcohol is converted to hydroperoxide. The resulting oxidation mixture contains the alcoholic starting material and the ketone hydroperoxide resulting from the oxidation. It will also contain equilibrium amounts of the corresponding ketone and hydrogen peroxide, and very minor amounts of by-products. As phthalic anhydride is added to this mixture, it reacts both with the hydrogen peroxide and with the unconverted alcohol and, since it upsets the equilibrium between ketone hydroperoxide, hydrogen peroxide, and ketone, the hydroperoxide is increasingly dissociated and ultimately the peroxidic oxygen is obtained in the form of the perphthalic acid. Introduction of propylene into this mixture either as the phthalic anhydride is being added or after its addition is complete leads to propylene oxide and, of course, phthalic acid.

The mixture of reaction products obtained as above described contains some excess phthalic anhydride, some ketone corresponding to the alcohol originally taken for oxidation, the half ester of phthalic acid with the alcohol used and phthalic acid. From this mixture the ketone and propylene oxide are readily separated by distillation. As the distillation is continued after the ketone is isolated, the half ester decomposes and the unoxidized alcohol is recovered. After separation of the unoxidized alcohol, which is of course recycled, water is removed and ultimately phthalic anhydride can be recovered. The phthalic anhydride is also recycled.

The addition of phthalic anhydride to the oxidation reaction mixture leads to its reaction with substantially all components of that mixture.

Since the half esters of phthalic acid are frequently solids, it may be desirable, at this point, to introduce either a solvent or a suspending liquid in order to maintain reasonable fluidity in the reaction mixture. The material chosen should be one which does not react with peroxidic oxygen or with phthalic anhydride or phthalic ester.

While it is desirable that the perphthalic acid have some solubility in the added liquid, it is not absolutely essential that this be the case. The solvent and suspending liquid can be chosen from substances as benzene, toluene, carbon tetrachloride, trichloroform, and the like.

Two alternatives exist with respect to the ketone which has been isolated. If the secondary alcohol chosen for the oxidation is such as to produce a ketone which is marketable, it can be sold. On the other hand if this is an undesirable course, it can readily be hydrogenated and the secondary alcohol thus produced can be recycled to the process.

The accompanying drawing is a schematic illustration of a preferred embodiment of the invention.

In order to indicate still more fully the nature of the present invention, the following examples of typical procedures are set forth in which parts and percents means parts and percents by weights, respectively, unless otherwise indicated, it being understood that these examples are presented as illustrative only and are not intended to limit the scope of the invention.

Referring to the accompanying drawing, the reactor 10 is charged with propylene introduced via line 12 and phthalic anhydride introduced via line 11, if desired inert solvent or carrier fluid may be introduced via line 13. The reactor 14 is charged with a secondary alcohol introduced via line 16 together with oxidation initiator, and gaseous oxygen or air is introduced via line 15. The resulting peroxidic mixture is passed via line 17 (after filtering, if desired, filter not shown) to the reactor 10 wherein the propylene is converted to proylene oxide. The resulting mixture is passed from reactor 10 via line 18 to the separation system 19 which may involve one or more distillation columns. Propylene oxide product is separated and removed via line 20. A secondary alcohol stream is separated and removed via line 26 and recycled via line 16 to the reactor 14. A by-product ketone stream is separated and passed via line 21 to hydrogenation reactor 23 wherein it is catalytically reacted with hydrogen introduced via line 24 to reform the secondary alcohol. The alcohol is passed via line 25 to line 26 and recycled to reactor 14. Optionally the ketone may be removed as by-product via line 21a. A stream of unreacted anhydride is separated and passed via line 33 back to line 11 and then to reactor 10. Acid and ester are processed in the separation system to reform the anhydride and this is passed via lines 33 and 11 back to reactor 10. Water is removed via line 32.

In an alternate the reaction mixture from reactor 14 is passed via lines 17 and 35 to a separator 36 wherein a peroxide-rich fraction is separated with water added via line 39 and passed via line 37 to the reactor 10. The ketone-rich fraction is passed via lines 38 and 21 to the hydrogenator 23, where the ketone therein is converted to secondary alcohol. Alternatively, it is passed via line 38a to ketone draw-off 21a.

*Example 1*

A mixture of 700 gms. of cyclohexanol substantially 100% pure, 7 gms. of commercial cyclohexanone peroxide and 7 gms. of powdered calcium carbonate is added via line 16 vigorously stirred in a 2-liter creased flask reactor 14. Oxygen is bubbled via line 15 through the mixture at a rate of 0.7 l./min. (measured at room temperature and atmospheric pressure) while the temperature is rapidly raised to 120° C. After 8 liters of oxygen have been absorbed, the flask is cooled at 110° C. and the oxidation is continued until a total of 17 liters of oxygen have been absorbed. Iodometric titration of the cooled oxidate indicates the presence of 0.57 mol of peroxidic oxygen representing an 80% efficiency to peroxide, from the absorbed oxygen. Alkaline titration indicates the presence of 0.02 equivalent of free organic acids. If air is used as the source of oxygen, a vent (not shown) is provided to remove inert gas.

The above oxidation can be initiated in the presence of 0.05–0.06 mol of peroxidic oxygen from a previous oxidate, instead of cyclohexanone peroxide.

To the oxidation mixture, filtered and transferred to a five liter Pyrex flask equipped with a mechanical agitator, gas inlet tube, and a condenser are slowly added 1300 grams of phthalic anhydride and 1500 mililiters of chloroform. Then 21 grams of propylene is introduced gradually over a period of 4 hours. Thereafter the mixture is maintained at 50° C. for two hours with vigorous agitation. At the end of this time, the mixture is charged to a still. Propylene oxide is distilled therefrom as an overhead fraction followed by chloroform which is recovered. A cyclohexanone fraction is recovered and then cyclohexanol is separated. After separation of the cyclohexanol, the the distillation, which is conducted under vacuum for the isolation of the cyclohexanone and the cyclohexanol, is returned to atmospheric pressure. Continued heating of the still pot results in the distillation of water and after the removal of the water, phthalic anhydride is distilled and separated. The cyclohexanone thus recovered can, of course, either be recycled, after hydrogenation, to the oxidation mixture or it can be sold.

It is frequently desirable to remove the ketone from the alcohol oxidation mixture prior to the reaction of the latter with the phthalic anhydride. As is well known, ketones can react with peracids to form esters or lactones. The ease with which this oxidative reaction occurs varies both with the peracid, its concentration and the ketone. In order to avoid formation of ester as a by-product and the loss of peroxidic oxygen to the desired epoxidation reaction, it is a simple matter, prior to the formation of the perphthalic acid, to remove ketones from the reaction mixture by distillation. In general, ketones obtained from secondary alcohols boil below the corresponding alcohol so that the separation by distillation is readily accomplished.

*Example 2*

The epoxidation of propylene is conducted essentially as described in Example 1, except that instead of oxidizing cyclohexanol, isopropanol is charged to the oxidation reactor and the conversion is carried to substantially twice that described in Example 1. In consonance with the higher concentration of peroxidic oxygen in the oxidation mixture the yield of propylene oxide is greater than that obtained by the process of Example 1. Otherwise, the results are essentially the same.

*Example 3*

The epoxidation of propylene is conducted essentially as described in Example 2, except following the oxidation reaction and before the perphthalic acid is formed, acetone is removed from the reaction mixture by distillation at reduced pressure. The distillation is so conducted that the concentration of peroxide at any point in the distillation column does not exceed about 40%. The solution of isopropanol and hydrogen peroxide which remains after the removal of the acetone is then treated with phthalic anhydride. In consonance with the higher concentration of peroxidic oxygen the oxidation mixture the yield of propylene oxide is greater than that obtained by the process of Example 1. Otherwise, the results are essentially the same.

In this way propylene is converted to propylene oxide by means of gaseous oxygen or air in an efficient manner and with no formation of undesirable by-products. In some modifications hydrogen is consumed, also; i.e. in reconverting ketone to secondary alcohol. The reaction is conducted at a temperature in the range of 35° to 60° C., although a broader range of 20° to about 120° C. is operable. The essential limitation is the rate of thermal decomposition of the perphthalic acid. Any temperature below that at which this well-known decomposition leads to extensive loss of peroxidic oxygen can be used. Hence, even the 120° C. limitation shown is not a sharply defined reaction maximum.

Any of the large number of secondary alcohols may be employed in the process. Two of particular interest are isopropyl alcohol and cyclohexanol. Isopropanol possesses the advantage that its conversion can be carried somewhat farther than can that of many other secondary alcohols and in addition, the ketone produced, i.e. acetone, is usually readily marketable. Cyclohexanol now abundantly and inexpensively available as a result of new cyclohexane oxidation processes produces as a co-product the very valuable cyclohexanone and hence can also be advantageously employed.

In a broad sense, this invention comprises a means for utilizing crude hydrogen peroxide for the epoxidation of propylene, in which the hydrogen peroxide costs are drastically reduced because it is not necessary that it be separated as a relatively pure and highly concentrated material. Thus, in the examples and descriptions so far given, the hydrogen peroxide is produced and used in the form of its loose addition compound with a ketone. Inexpensive hydrogen peroxide can be produced by other means. It is known, for example, to make hydrogen peroxide by the air oxidation of alkyl anthraquinols. The oxidation product in this case is an alkyl anthraquinone hydroperoxide from which a fairly concentrated solution of hydrogen peroxide in water is very readily obtained. The readily obtained solution is, however, contaminated with some amounts of organic material and the separation of pure hydrogen peroxide therefrom would be costly. As an alternative to the procedures already described, the impure hydrogen peroxide solution obtained as a primary product, from the alkylanthaquinole oxidation can be used, as described, to form perphthalic acid. From this point the reactions proceed as already described. The use of hydrogen peroxides of this type for the formation of propylene oxide via perphthalic acid in the fashion already described is, of course, within the scope of this invention.

In view of the foregoing disclosures, variations and modifications thereof will be apparent to one skilled in the art, and it is intended to include within the invention all such variations and modifications except as do not come within the scope of the appended claim.

What is claimed is:

The process for preparing propylene oxide of reacting a secondary alcohol selected from the group consisting of cyclohexanol and isopropanol with molecular oxygen in the presence of a peroxide initiator until 4 to 25% of the alcohol is reacted to form a reaction solution containing 0.04 to 0.18 mol peroxidic oxygen per 100 grams of solution, contacting the resulting solution with phthalic anhydride and propylene at a temperature in the range of 20 to 120° C., and recovering propylene oxide.

References Cited by the Examiner

UNITED STATES PATENTS

| | | | |
|---|---|---|---|
| 2,115,207 | 4/1938 | Milas | 260—610 |
| 2,273,774 | 2/1942 | Reichert et al. | 260—502 |
| 2,316,604 | 4/1943 | Loder et al. | 260—348.5 |
| 2,377,038 | 5/1945 | Reichert et al. | 260—502 |
| 2,508,256 | 5/1950 | Harmon | 260—502 |
| 2,660,563 | 11/1953 | Banes et al. | 260—348.5 |
| 2,692,271 | 10/1954 | Greenspan et al. | 260—348.5 |
| 2,786,854 | 3/1957 | Smith et al. | 260—348.5 |
| 2,871,104 | 1/1959 | Rust | 23—207 |
| 2,869,989 | 1/1959 | Keeler et al. | 23—207 |
| 2,873,283 | 2/1959 | Yang | 260—348.5 |
| 2,977,374 | 3/1961 | Phillips et al. | 260—348.5 |

OTHER REFERENCES

Brown et al.: J.A.C.S. (1955), vol. 77, pp. 1756–1759.

Hawkins: Organic Peroxides, E. and F. Spon Ltd., London (1961), pp. 377–378.

Schenck et al.: Angewandte Chemie (1958), vol. 70, p. 504.

WALTER A. MODANCE, *Primary Examiner.*

NICHOLAS S. RIZZO, JOHN D. RANDOLPH,
*Examiners.*